United States Patent [19]

Nielsen

[11] 4,444,336
[45] Apr. 24, 1984

[54] DISPENSING UNIT

[75] Inventor: Carl P. Nielsen, Hunters Hill, Australia

[73] Assignee: Burns, Philp & Company, Ltd., New South Wales, Australia

[21] Appl. No.: 293,724

[22] Filed: Aug. 17, 1981

[30] Foreign Application Priority Data

Aug. 27, 1980 [AU] Australia .............................. PE5283

[51] Int. Cl.³ .............................................. B67D 5/56
[52] U.S. Cl. .................................. 222/129.4; 222/185; 222/504
[58] Field of Search .................. 222/129, 129.1, 129.2, 222/129.3, 129.4, 132, 504, 518, 173, 181, 185, 144.5; 99/295; 248/311.3; 312/42, 45, 60

[56] References Cited

U.S. PATENT DOCUMENTS

| 3,195,588 | 7/1965 | Geffner | 222/129.4 X |
| 3,236,270 | 2/1966 | Stutz | 222/129.4 X |
| 3,439,717 | 4/1969 | Bode | 222/129.3 X |
| 3,589,458 | 6/1971 | Schwake et al. | 222/518 X |
| 3,739,946 | 6/1973 | Scholer | 222/129.4 X |
| 4,149,454 | 4/1979 | Kemp | 99/295 |
| 4,354,427 | 10/1982 | Filipowice et al. | 99/295 X |
| 4,392,588 | 7/1983 | Scalera | 222/129.4 |

Primary Examiner—Robert B. Reeves
Assistant Examiner—Russell D. Stormer
Attorney, Agent, or Firm—Jim Zegeer

[57] ABSTRACT

Beverage dispensing apparatus is described including ingredient hoppers arranged in a circular array and including individual dispensing chutes extending from each hopper downwardly and inwardly in a conical array so as to disperse ingredients selected from any of the hoppers into a receptacle positioned beneath the vortex of the conical array.

9 Claims, 4 Drawing Figures

DISPENSING UNIT

The present invention relates to devices for dispensing beverages of the type requiring the initial dispensing of one or more dry ingredients and the subsequent addition of a liquid such as water.

Machines of this type are customarily used for dispensing beverages such as coffee, tea, chocolate or soup selected in accordance with the user's wishes, together with such additions as sugar or whitener as required. It follows that these machines should preferably be able to accomodate perhaps six or more separate ingredient hoppers which must be readily accessible for replenishing as required.

It is a primary object of the present invention to provide a dispensing unit for dispensing a plurality of dry ingredients wherein the ingredient hoppers are arranged in a compact form and are readily accessable and removable for replenishment.

The invention achieves this object by arranging the ingredient hoppers in a circular array and providing individual dispensing chutes extending from each hopper downwardly and inwardly in a conical array so as to dispense ingredients selected from any of the hoppers into a receptacle positioned beneath the vertex of the conical array.

Preferably, a liquid dispensing outlet is provided adjacent the vertex of the array and centrally located with respect to it.

A preferred embodiment of the invention will now be described, by way of example only, with reference to the accompanying drawings in which.

Figure 1:
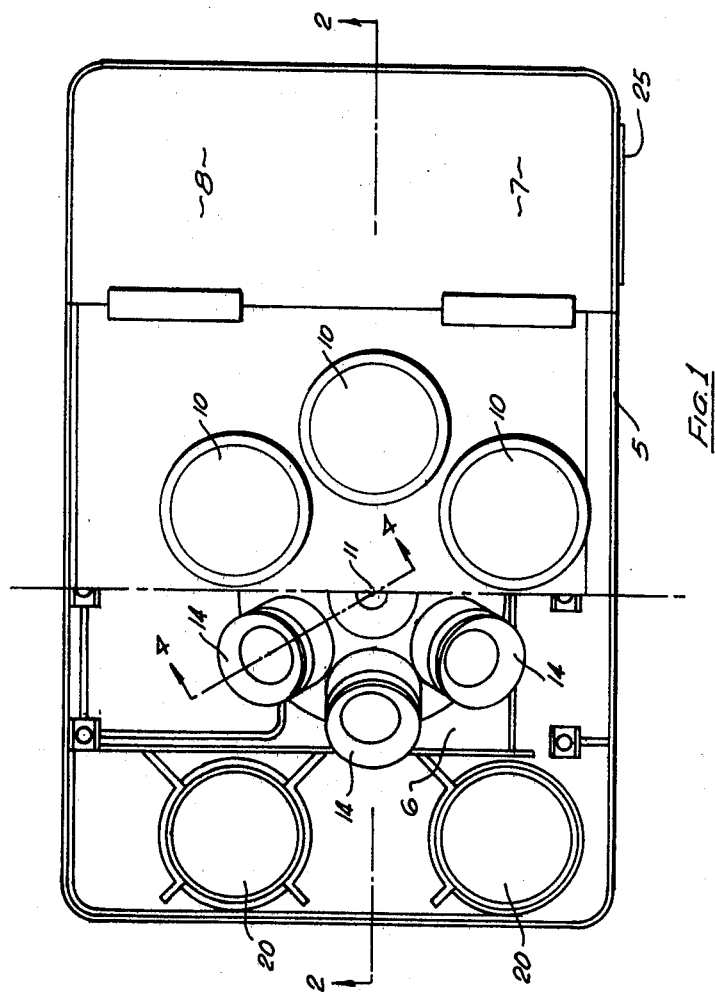
FIG. 1 is a plan view of a dispensing unit according to the invention.
Figure 2:
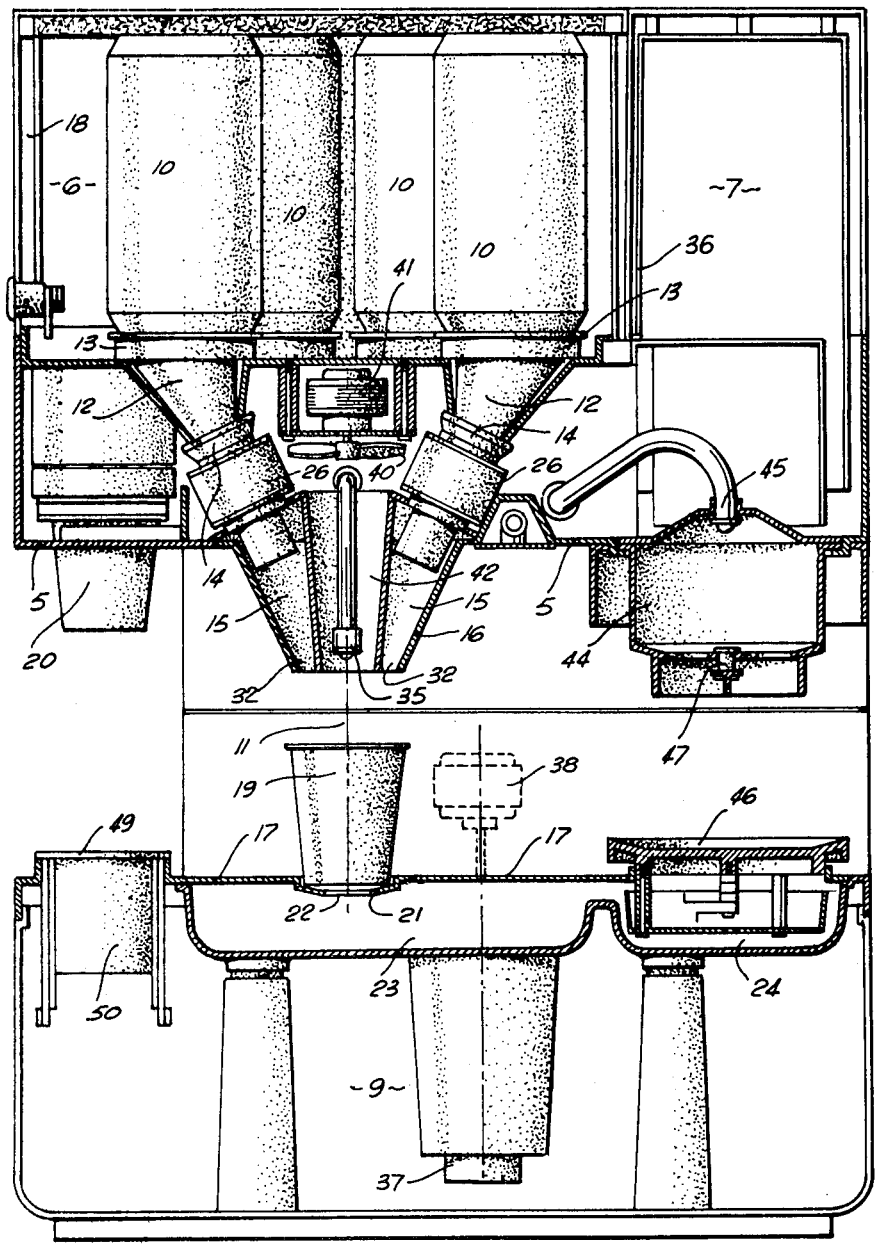
FIG. 2 is a sectional front elevation of the dispensing unit, taken on line 2—2 of FIG. 1.
Figure 3:
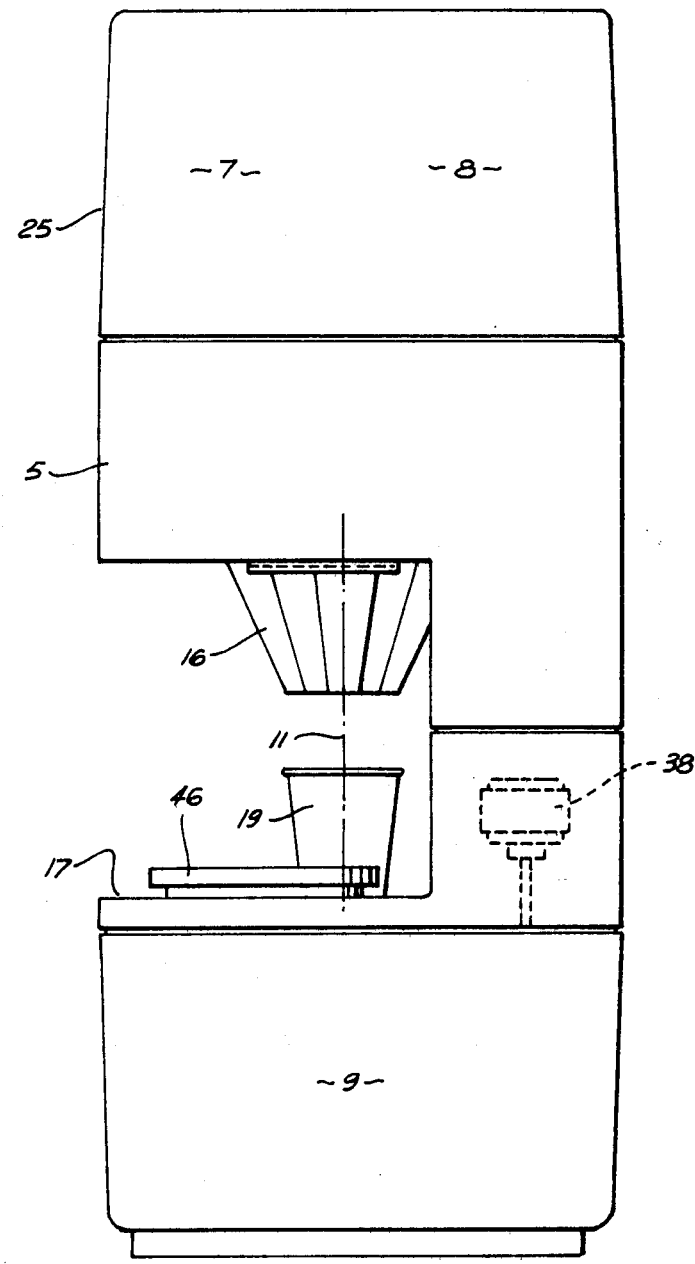
FIG. 3 is an end elevation of the dispensing unit shown in FIGS. 1 and 2.
Figure 4:
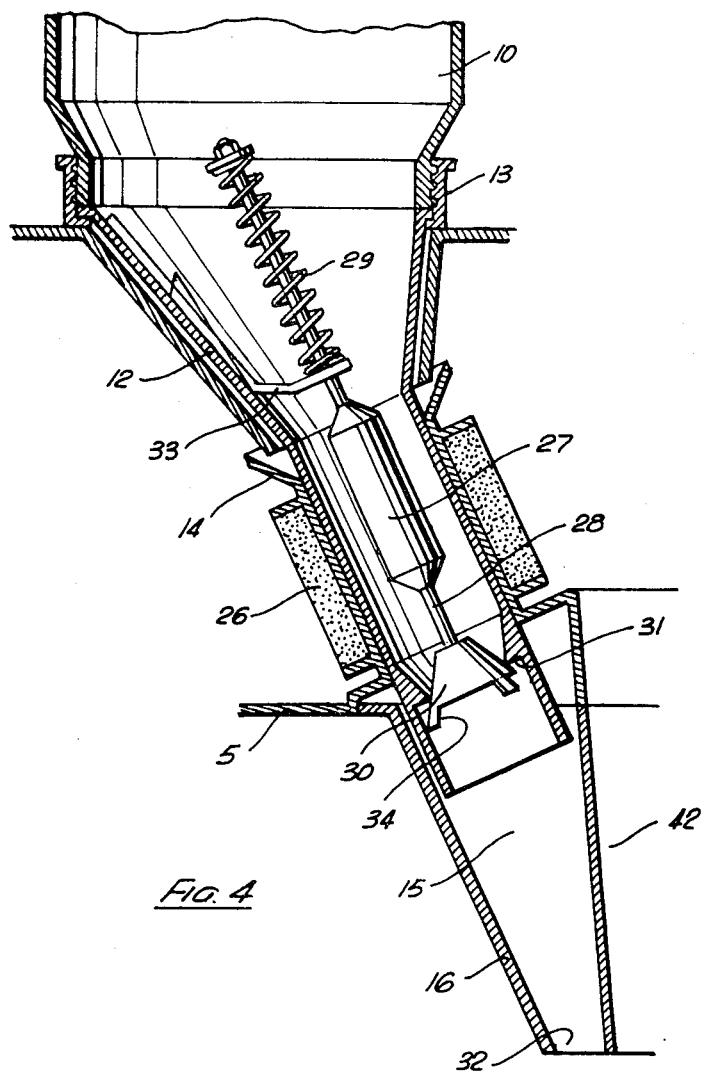
FIG. 4 is a side sectional view of the valve member.

Referring to the drawings, the dispensing unit includes a body casing 5 divided broadly into four regions 6, 7, 8 and 9. Area 6 contains a plurality of ingredient storage hoppers 10 arranged in a circular array about an axis 11. A dispensing chute 12 is releasably attached to each hopper 10 by a threaded sleeve 13 and extends downwardly and inwardly to engage with respective sockets 14 arranged in a conical array concentric with the axis 11. The dispensing chutes 12 open into individual passages 15 circumferentially spaced around a dispensing cone 16 extending from the cantilevered housing 5 and positioned above a serving shelf 17. A hinged lid 18 provides ready access to the region 6 and the hoppers 10 which can be easily removed from the dispensing unit, together with their individual dispensing chutes which simply withdraw from their associated sockets 14.

In operation, the user selects a disposable cup 19 from a pair of cup dispensing stacks 20 and places the cup onto the serving shelf 17 directly beneath the dispensing cone 16. Preferably, the shelf 17 is provided with an indented portion 21 and a drain hole 22 for locating the cup and collecting any accidental spillage. A pair of troughs 23 and 24 are provided beneath the serving shelf 17 to catch and drain away any spillage.

With the cup in position beneath the dispensing cone, the user selects any required combination of dry ingredients by depressing buttons or other suitable switches located on an operating panel 25. Known electrical control apparatus within region 7 then energizes electro-magnetic coils 26 surrounding the socket and dispensing chute associated with each preselected ingredient. Once energised, the coil 26 acts upon a metallic core 27 mounted on a spindle 28 to draw the spindle downwards against the action of a compression return spring 29. Downward movement of the spindle moves a conical valve closure member 30 out of engagement with its seat 31, thereby to discharge a preselected quantity of dry ingredient down the dispensing chute 12 and into the adjacent underlying passage 15 in the dispensing cone 16 from whence it falls through aperture 32 into the waiting cup 19.

Each spindle 28 is secured to the dispensing chute 12 by an inwardly extending bracket 33 against which the return spring 29 bears to close the valve 30 and interrupt the ingredient flow once current is automatically removed from the coil 26 is a preselected time after initial actuation by the control button individual to that ingredient. Bracket 33 is longitudinally slotted from its bottom end so as to engage with a rib formed in the wall of the dispensing shute. Tension from return spring 29 holds the bracket in engagement with the rib.

The conical valve member 30 is preferably provided with three or more outwardly extending prongs 34 which space the valve member away from the inner wall of the dispensing chute when the valve is in its open position, thereby promoting uniformity of ingredient dosage.

The electrical control circuitry of the dispensing unit is well known and it need not be described further. The circuitry may readily provide for immediate dispensing of any selected ingredient or means may be provided for simultaneously dispensing a preselected number of dry ingredients upon initiation of a "dispense" function following plural selection, thereby permitting prior cancellation of any ingredient selected in error.

When the preselected number of dry ingredients have been dispensed into the cup, the user presses a further button and hot water is admitted to the cup through a centrally located nozzle 35. The nozzle 35 is supplied via a solenoid valve from a heater tank 36 located within region 8. A thermostatically controlled electrical heating element is provided in the tank 36 which is supplied with cold water from a reservoir in region 9 via a float level actuated pump 37 driven by an electric motor 38.

The unit may be arranged to dispense a preselected quantity of hot water but the water flow is preferably controlled entirely from the dispensing button such that it may be stopped by the user at any selected cup level. Preferably also, a fan 40 is located directly above the dispensing cone 16 and driven by an electric motor 41 to direct a downward flow of air through the central annular passage 42 of the dispensing cone throughout the period that hot water is flowing into the cup. The downward flow of air past the nozzle 35 and out over the top of the cup ensures that any steam or water vapour leaving the nozzle is forced away from the dispensing cone so that it cannot rise up into the passages 15 and moisten the dry ingredients or their flow paths. Preferably, timing circuitry ensures that the operational period of fan 40 overlaps the water dispensing period both at its commencement and end.

In a particularly preferred form, the dispensing unit is provided with a facility for coffee brewing. This facility takes the form of a brewing basket 44 slidably mounted above the shelf 17 and beneath a separate water dispensing nozzle 45. A thermostatically controlled hot plate 46 is provided to support a jug (not shown) directly beneath the brewing basket. In operation, a filter paper insert is placed within the basket 44 and the required amount of coffee granules added. The basket then slides beneath the nozzle 45 into position above the jug. Actuation of a dispensing button on the control panel 25 causes a charge of hot water to enter the brewing basket and percolate gradually through the coffee granules above the filter paper, then through the paper and out through an aperture 47 in the floor of the basket into the waiting jug.

Preferably also, the cold water reservoir within chamber 9 is filled through a filling orifice closed by a hingedly mounted lid 49 which is itself shaped to define a trough 50 for holding wooden stirring sticks. The trough 50 is angled forwards so that the vertically extending sticks do not fall from the trough when the hingedly mounted lid 49 is lifted to provide access to the cold water reservoir.

Although the invention has been described with reference to a specific example it will be appreciated by those skilled in the art that the invention may be embodied in many other forms.

I claim:

1. Beverage dispensing apparatus for selectively dispensing a quantity of one or more of a number of dry ingredients into a receptacle for mixing with hot liquid such as water comprising:
   a plurality of hoppers arranged in a circular array,
   individual dispensing chutes extending from each hopper downwardly and inwardly in a conical array so as to dispense ingredients selected from any of said hoppers into said receptacle when it is positioned beneath the vertex of said conical array, and a dispensing cone located beneath said conical array and having a central passage and an annular region separate from said central passage, said annular region being divided into a plurality of downwardly extending passages circumferentially spaced around said dispensing cone, each said dispensing chute discharging into one of said circumferentially spaced passages.

2. Apparatus as defined in claim 1 including a valve located in each dispensing chute for controlling the discharge of said dry ingredients.

3. Apparatus as defined in claim 2, including a metallic spindle located within each dispensing chute and an electro-magnetic coil surrounding each said socket, said spindle being connected to a movable valve closure member and resiliently biased to close said valve and movable against said bias to open said valve open electric actuation of its respective coil.

4. Apparatus as defined in claim 3, including a valve seat extending inwardly from the interior wall of said dispensing chute, and wherein said movable valve closure member is conical with its apex directed upwardly and wherein a plurality of outwardly extending prongs are fitted to the downward side of said valve member and adapted to engage the inner wall of said dispensing chute when the valve closure member is in its open position.

5. Apparatus as defined in claim 1, including a fan located directly above said dispensing cone such that it directs a downward flow of air downwardly through said central passage to prevent that steam or water vapour arising from said receptacle from rising up into said dispensing chutes.

6. Apparatus as defined in claim 5, including electrical control means to operate said fan prior to, during and subsequent to the period during which hot water is added to said receptacle.

7. Apparatus as defined in claim 1, including a facility for coffee brewing comprising:
   a hot water dispensing nozzle;
   a brewing basket mounted below said nozzle;
   an aperture in the floor of said basket;
   means for accommodating a filter paper insert within said basket and electrical control means to cause a charge of hot water to enter said brewing basket.

8. Beverage dispensing apparatus as defined in claim 1 including means rendering said hoppers removable from their respective chutes.

9. Apparatus as defined in claim 1, said dispensing cone including a plurality of sockets, one socket at the upper end of each of said plurality of downwardly extending passages circumferentially spaced around said cone, for coupling said dispensing chutes to each of said dispensing cones, respectively.

* * * * *